United States Patent [19]

Rubin et al.

[11]  4,401,679
[45]  Aug. 30, 1983

[54] PROCESS FOR PREPARING CHEESE-BASE

[75] Inventors: Jan Rubin; Poul Bjerre, both of Silkeborg, Denmark

[73] Assignee: Pasilac A/S, Silkeborg, Denmark

[21] Appl. No.: 290,717

[22] Filed: Aug. 6, 1981

[30] Foreign Application Priority Data

Jul. 17, 1981 [GB] United Kingdom ............... 8122195

[51] Int. Cl.³ ............... A23C 19/02; A23C 19/028; A23C 19/045
[52] U.S. Cl. .......................... 426/36; 426/582
[58] Field of Search .............. 426/36, 37, 41, 582

[56] References Cited

U.S. PATENT DOCUMENTS 3,914,435 10/1975 Maubois et al. ............... 426/36
3,963,837 6/1976 Maubois et al. ............... 426/36
4,205,090 5/1980 Maubois et al. ............... 426/36

FOREIGN PATENT DOCUMENTS 1438533 6/1976 United Kingdom .
1451740 10/1976 United Kingdom .
1498437 1/1978 United Kingdom .
1540208 2/1979 United Kingdom .
1572203 7/1980 United Kingdom .

Primary Examiner—Jeanette M. Hunter
Attorney, Agent, or Firm—Lowe, King, Price & Becker

[57] ABSTRACT

A process for preparing cheese-base by concentrating milk in a manner known per se through ultrafiltration combined with diafiltration and evaporation, whereby the retentate from the ultrafiltration is inoculated with an acid culture before the evaporation and after evaporation acidifies to completion in packing.

The process may be carried out during a normal working-day, and it ensures a high yield in the preparation of cheese.

6 Claims, No Drawings

PROCESS FOR PREPARING CHEESE-BASE

When preparing process cheese, a mixture of fresh (uncured) cheese and cured cheese is used, which is melted and pasteurized and subsequently packed in retail packings. The thus prepared process cheese possesses a good storability since the fermentative processes have stopped in the curd, and it is possible to prepare a product of a uniform taste and texture.

Previously both the fresh and the cured cheese for the preparation of process cheese were prepared in a conventional manner by curdling milk through addition of rennet, cutting the coagulum, and separating whey through syneresis, as well as shaping and pressing the curd.

When the proteins of the milk are concentrated through syneresis, part of the proteins dissolved in the whey are lost. It has been suggested to ultrafilter the milk before the preparation of cheese by using membranes allowing milk serum (whey) containing dissolved salts and lactose to pass as permeate, whereas cassein, whey proteins and some lactose remained as retentate. The retentate was subsequently used for the preparation of camenbert and other cheeses of a high content of liquid (French Pat. No. 2052121). By this method, the yield of cheese production was increased by 16-18%.

The ultrafiltration of the milk is not immediately applicable to the preparation of solid cheese, partly because it is not possible to concentrate the milk to a sufficiently high content of dry matter by the ultrafiltration, and partly because the content of lactose in the retentate is too high, as a result of which the cheese during the ripening will have a too low pH-value.

It has been suggested to combine the ultrafiltration with a diafiltration, i.e. ultrafiltering whilst simultaneously adding water. In this manner it is possible to "wash out" the lactose of the retentate whereby the lactose content of the retentate is reduced to a desired size. The retentate thus prepared was subsequently inoculated and incubated for fermenting the remaining lactose and obtaining the desired pH-value. The acidified retentate was subsequently evaporated to a dry-matter percentage corresponding to the desired type. The product, cheese-base, could replace the uncured cheese by the preparation of process cheese.

The cheese-base thus prepared did, however, lack the form and texture of the fresh cheese. A mixture of 80% cheese-base and cured cheddar cheese gave a satisfactory process cheese and process cheese food with respect to taste, but the form and the texture of the process cheese were much too solid.

By the preparation of cheese-base, one will, as previously mentioned, obtain a 16-18% increased yield of the milk compared to what is obtained when cheese is prepared in a traditional manner. In addition, a line better suited for industrial processing is obtained. This method for cheese-base making is, however, encumbered with the draw-back that the retentate during the acidifying before the evaporation must stand for about 16 hours. This means that the process cannot be carried out during a normal working-day, and it causes problems concerning the week-end closing of the factory.

A further draw-back of this known method is that an evaporation must be carried out after acidifying, which increases the viscosity of the retentate. As a result the evaporation and the following packing procedures are made difficult.

The object of the invention is to provide a process for preparing cheese-base, whereby the treatment of milk, i.e. pasteurization, ultra/dia-filtration, inoculation, evaporation, and packing, may be completed during a normal working-day, and whereby the evaporation and the packing are carried out before acidifying of the retentate has increased the viscosity of the retentate, said acidifying being necessary for obtaining an appropriate pH-value of the end product.

By the process according to the invention the milk is concentrated in a manner known per se by ultrafiltration combined with diafiltration to reduce the lactose content, and evaporated to a desired dry-matter percentage, and the process is characterised in that the retentate from the ultrafiltration is inoculated with an acid culture before the evaporation, and after the evaporation and packing, it acidifies to completion.

When the final acidifying takes place in the ready prepared and packed product, the packed cheese-base has to stand for 20-30 hours at a temperature of 20-30° C. Subsequently, it may either be used for process cheese immediately, or be stored until it is to be used.

It is to be understood that instead of the acidifying tanks which must have room for the production during one day of retentate, a ripening room must be at disposal, in which the packed cheese-base is piled and a constant optimal acidifying temperature is kept for the culture used. The ripening room may be provided with a time-controlled thermostat device, which automatically lowers the temperature when the acidifying is completed. This ripening room may optionally be equipped with a transport device which continuously or stepwise carries the packed cheese-base through the ripening room at a velocity such that the acidifying is completed, e.g. in 24 hours, when the cheese-base leaves the ripening room.

Since the handling of the packed cheese-base during acidifying to completion can be automatized without difficulty, supervision of this part of the preparation process is made superfluous.

By the process according to the invention, evaporation and packing of the retentate are easier than by the previously known method, since the retentate which is not acidified to completion possesses a lower viscosity.

According to the invention, the temperature of the retentate is during the evaporation kept at a temperature not impeding the acidifying that follows, and the evaporation is carried out under vacuum. The temperature of the retentate is preferably kept between 35° and 50° C. during the evaporation.

According to the invention, the retentate is pasteurized before the inoculation, e.g. through heating to 72° C. for 15 seconds. The ultra- and the diafiltration are carried out at a temperature of about 50° C., for which reason the milk may be infected during this part of the process. It is therefore preferred that the pasteurization be carried out before the inoculation and the evaporation.

According to the invention, it is preferred that immediately upon inoculation, the retentate be held for 1-2 hours at an optimal acidifying temperature, so that the bacteria of the acid culture will have been activated and propagated before the evaporation. Through this acidifying, a good distribution of the culture in the retentate is obtained, and the bacteria are more resistant to the relatively high evaporation temperature.

According to the invention it is preferred to add the acid culture and salt continuously to the retentate, whereby a continuous processing is obtained, with milk from the initial pasteurization and standardization passing a membrane filter continuously and being evaporated and subsequently packed.

For preparing cheese-base, either full-cream or skimmed milk may be used. When full-cream milk is used, the milk is initially standardized to a desired fatty content, preferably in connection with a pasteurization with, e.g. at 72° C. for 15 seconds and at a starting temperature of about 50° C. appropriate as access temperature to the ultrafiltration plant.

When the starting material is skimmed milk, the desired amount of fatty substance, e.g. in the form of cream, butter oil or soya bean oil, is added during the preparation of process cheese.

When carrying out the process according to the invention it is important that the lactose content of the retentate during the diafiltration is correctly set, inter alia, with respect to the buffer effect in the starting material, in such a manner that the desired pH-value is obtained in the completed cheese-base after the acidifying is completed. The fermentation in the cheese-base stops when the added acid culture has converted the lactose present. Thus the pH-value is not changed when the cheese-base which is acidified to completion is held at short time longer than necessary at the fermentating temperature. Even an overrun of 24 or 48 hours within the ripening room before cooling down to the curing temperature will not damage the product.

Cheese-base prepared by the process according to the invention may be cured a few months at 2° C. and many months at a temperature below $-10°$ C. without noticeable changes in its applicability for the preparation of process cheese.

Cheese-base prepared by the process according to the invention is used in a manner known per se for the preparation of process cheese optionally, with cured cheese, e.g. in the ratio of 80% of cheese-base to 20% of cured cheese. Process cheese may be prepared either in the form of cheese-spread or block cheese which can be cut into slices.

ILLUSTRATING EXAMPLE 3000 kg of full-cream milk is standardized to 3.6% fat, pasteurized at 72° C. with a holding period of 15 seconds. The milk is ultra- and diafiltrated at 50° C. to 1.17% of lactose and 40% of dry matter. This retentate is pasteurized at 72° C. with a holding period of 15 seconds and cooled to 30° C. Subsequently 1% of acid culture (Chr. Hansen culture O-No. 171) is added and is held for 2 hours. The inoculated product is evaporated under vacuum at 42° C. and 95% of vacuum to 62% of dry matter. The product is packed and is held at 25° C. for 26 hours, whereafter the pH-value of the product is 5.2 and does not fall further. The thus prepared product can be used in a manner known per se as raw material for the preparation of process cheese.

The evaporated retentate may either be cooled to the fermenting temperature before packing, or packed at the evaporation temperature and held in the ripening room, in which the temperature is kept constant so that the temperature of the cheese-base decreases gradually. As a result, an average temperature is obtained, which provides the optimal fermentation.

Different types of packings may be used for the cheese-base depending on the type of storage or optionally the transport. When no particular requirements are presented, the cheese-base may be packed in vacuum-sealed plastic bags.

We claim:
1. A process for preparing cheese-base of improved storage and curing characteristics from milk which comprises the steps of:
    (a) concentrating the milk by ultrafiltration combined with diafiltration to produce a retentate of reduced lactose content;
    (b) inoculating the retentate from the concentration step by the addition of an acid culture;
    (c) evaporating the inoculated retentate to a desired dry-matter percentage;
    (d) packing as a prepared product and acidifying the packed and prepared product to produce the cheese-base.
2. A process as claimed in claim 1, wherein the temperature of the retentate during the evaporation step is maintained at a temperature which does not impede the acidifying step.
3. A process as claimed in claim 2, wherein the evaporation is carried out under vacuum at a temperature of between 35° and 50° C.
4. A process as claimed in claim 1, wherein the retentate is pasteurized before inoculation.
5. A process as claimed in claim 1, wherein immediately after the inoculation with an acid culture, the retentate is held 1 to 2 hours at an optimal acidifying temperature.
6. A process as claimed in claim 1, wherein the acid culture and salt are added continuously to the retentate.

* * * * *